United States Patent [19]

Cannon

[11] 4,125,294
[45] Nov. 14, 1978

[54] FLUID PRESSURE CONTROL VALVE DEVICE ARRANGED FOR FAIL-SAFE OPERATION

[75] Inventor: John G. Cannon, Penn Hills, Pa.

[73] Assignee: Westinghouse Air Brake Company, Wilmerding, Pa.

[21] Appl. No.: 849,821

[22] Filed: Nov. 9, 1977

[51] Int. Cl.² .................................................. B60T 15/30
[52] U.S. Cl. .................................... 303/37; 303/69; 303/63; 303/82
[58] Field of Search ................... 303/37, 63, 69, 70, 303/71, 81, 82, 83, 92

[56] References Cited

U.S. PATENT DOCUMENTS

| | | | |
|---|---|---|---|
| 4,025,126 | 5/1977 | Wilson | 303/69 |
| 4,043,605 | 8/1977 | Hart | 303/37 |

Primary Examiner—Trygve M. Blix
Assistant Examiner—Reinhard J. Eisenzopf
Attorney, Agent, or Firm—R. W. McIntire, Jr.

[57] ABSTRACT

In a proportioning type control valve device in which a piston valve assemblage is actuated to service position in accordance with a differential between brake pipe and control reservoir pressures on opposite sides of an actuating piston abutment forming a part of the piston valve assemblage, there is provided on the control reservoir side of the piston abutment a bellows device that is normally held under compression by the presence of control reservoir fluid pressure so as to be normally disengaged from the piston and engageable therewith only in the absence of control reservoir pressure to serve as the reference against which reductions in brake pipe pressure are measured to establish the actuating force on the piston abutment. When disengaged from the piston abutment under the influence of the control reservoir pressure, the bellows holds a control spring housed within the bellows under compression. This control spring acts through the bellows to provide the desired reference force on the piston abutment in the absence of sufficient control reservoir pressure to hold the bellows under compression.

8 Claims, 1 Drawing Figure

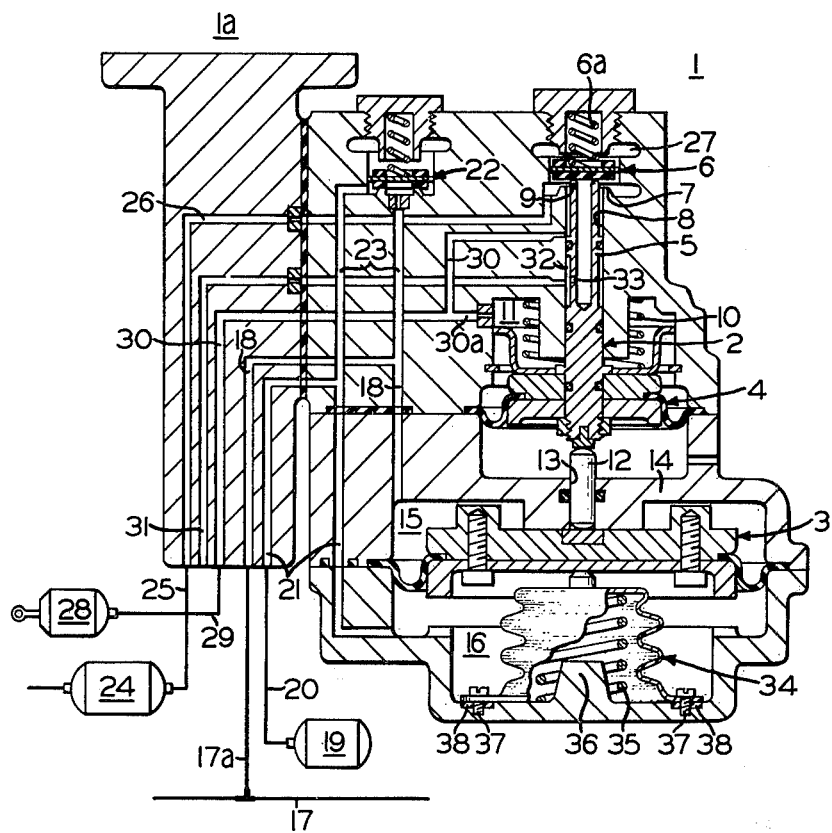

FLUID PRESSURE CONTROL VALVE DEVICE ARRANGED FOR FAIL-SAFE OPERATION

BACKGROUND OF THE INVENTION

The present invention is related to fluid pressure control valve devices of the proportioning type and particularly to such proportioning type control valve devices as used to graduate the application and release of the air brakes on railway vehicles.

These proportioning type control valve devices are of a basically conventional design in that a diaphragm piston stack comprising a control piston and a compensating piston is carried on a central stem that terminates in an annular exhaust valve seat. Engageable with this exhaust valve seat is a disc valve element that is spring-biased toward engagement with an annular supply valve seat surrounding the exhaust valve seat.

The piston stack is operative to a brake application position in which the exhaust valve seat engages and unseats the disc valve from the supply valve seat in response to a reduction of brake pipe pressure, which acts on one side of the control piston in opposition to a reference pressure on the opposite side. This reference pressure, commonly referred to as control reservoir pressure, is charged from brake pipe pressure via a one-way check valve which traps the pressure at the time of a brake pipe reduction to provide a reference pressure against which the brake pipe reduction is measured.

The resultant pressure differential between brake pipe and control reservoir pressures thus establishes an actuating force differential on the piston stack to move the stack to brake application position. As the resultant flow of supply pressure to the brake cylinders via the unseated supply valve develops, this pressure is conducted also to one face of the compensating piston to effect a force on the piston stack in a direction opposing the actuating force. When these counteracting forces are substantially balanced, the piston stack assumes a lap position in which the supply valve is again seated to terminate any further supply of pressure to the brake cylinders. Since in lap position, the exhaust seat also remains engaged with the valve element, brake cylinder pressure is neither increased nor decreased and is thus maintained constant until the force balance on the piston stack changes, such as to instigate a further brake application or alternatively a brake release.

The desired degree of brake release can be obtained by increasing brake pipe pressure so that the preponderance of forces on the piston stack urge its movement toward brake release position, in which position the exhaust valve seat becomes disengaged from the valve element, which remains seated on the supply valve seat. Consequently, brake cylinder pressure including the pressure acting on the compensating piston is exhausted until the force holding the piston stack in release position in accordance with the degree of brake pipe pressure is counterbalanced by the reduction of pressure on the compensating piston to again obtain a force balance to lap the brakes. In this way, the brake pressure may be increased and released in graduated increments or as a single continuous operation.

Instruction Pamphlet No. 5074-5, published January, 1964 and entitled "27-LB-1 Locomotive Brake Equipment" shows and describes in detail a commercially active control valve device of the above-discussed type and its use in a locomotive brake system.

As is well known in the railroad industry, fail-safe operation is most desirable and continuously strived for. An unintentional loss of brake pipe pressure, for example, will result in an automatic application of the brakes of a locomotive controlled by the proportioning type control valve device described above. Although not as apt to occur as a loss of brake pipe pressure, there does exist the more remote possibility of the reference or control reservoir pressure being lost, which would render the brakes inoperable due to the inability of a brake pipe reduction to establish a pressure differential on the piston stack in a brake application direction.

SUMMARY OF THE INVENTION

The object of the present invention is to provide means capable of being activated automatically in the event of loss of the reference or control reservoir pressure so as to exert a control force on the piston stack of a proportioning type control valve so as to effect movement thereof to brake application position when a brake pipe pressure reduction is made.

In a preferred embodiment of the invention, this objective is met by providing a compression-type control spring in the control reservoir chamber of a proportioning-type control valve device to exert a load on the actuating piston abutment in a brake application direction. In order to normally withhold this control spring from acting on the actuating piston when control reservoir pressure exists, the control spring is housed within a conventional-type bellows device, which is itself compressible. Under the influence of control reservoir pressure, the bellows is thus compressed to hold the control spring under compression also, such being the case that the spring load is withheld from the actuating piston abutment. In the event control reservoir pressure is lost, however, the bellows is unloaded, thus permitting expansion thereof by the control spring (as well as by its own spring effect) into engagement with the actuating piston abutment. Upon a subsequent reduction of brake pipe pressure, therefore, the spring load acting on the actuating piston abutment will become effective to force the piston stack to application position.

In that a bellows device itself inherently provides spring action, it is entirely conceivable an alternate arrangement would permit use of the bellows without the previously mentioned control spring.

BRIEF DESCRIPTION OF THE DRAWING

Other objects and advantages will be apparent from the following description when taken in conjunction with the accompanying single FIGURE drawing showing a cross-sectional, elevational view of a control valve according to the preferred embodiment.

DESCRIPTION AND OPERATION

The control valve device 1 comprising the present invention in its preferred embodiment is shown mounted on a typical pipe braket 1a, which permits easy removal of the valve device for maintenance or servicing without disturbing the several pipe connections, since these connections remain intact with the pipe bracket 1a.

The piston valve assembly 2 of the control valve device 1 is of a generally conventional design, comprising a diaphragm-type actuating piston abutment 3, a diaphragm-type compensating piston abutment 4 which includes a hollow stem 5 on which the piston abutment is carried, and an annular disc valve element 6 that is biased by a light spring 6a toward engagement with an annular supply valve seat 7 formed about the open end of a bore 8 in the valve body. Stem 5 is guidably disposed in bore 8 and terminates in an annular exhaust valve seat 9 coaxial with supply valve seat 7 so as to be movable into and out of engagement with valve element 6.

A return spring 10 in a chamber 11 formed on the upper side of diaphragm piston abutment 4 urges the piston abutment in a downwardly direction. A pusher pin 12 in a bore 13 formed in a partition 14 of the valve body interconnects piston abutment 4 and piston abutment 3, the latter separating the valve body into separate chambers 15 and 16.

There is connected from a trainline 17 and branch pipe 17a a passage 18 leading to chamber 15. A control reservoir 19 is connected via pipe 20 and passage 21 to chamber 16. A charging check valve device 22 is disposed in a branch passage 23 via which the passages 18 and 21 are connected. A storage reservoir 24 is connected via pipe 25 and passage 26 to a chamber 27 housing valve element 6. A brake cylinder device 28 is connected via pipe 29 and passage 30 to the bore 8 and also via branch pressure 30a to chamber 11. A passage 31 connects atmosphere to bore 8 and thence to the central cavity formed by hollow stem 5 via annular groove 32 and cross passage 33.

The improvement brought about by the present invention entails the use of a bellows device 34 that is housed in chamber 16, and a helical control spring 35 that is housed within the bellows. The bellows is preferably of a conventional design having relatively thin, corrugated, metal side walls closed at one end and open at the opposite end. A combined spring guide and bellows stop 36 projects inwardly from the valve casing via the open end of the bellows so as to also be situated within the bellows to properly align and maintain spring 35 in a central position when the bellows is secured in place, as by screws 37 and to limit downward deflection of the bellows. A gasket 38 effectively seals the open end of the bellows to isolate the bellows inner chamber from the pressure effective in chamber 16 when screws 37 are tightened down.

Assuming there is no air pressure effective at valve device 1, it should be apparent that spring 35 will effect expansion of bellows 34 into engagement with actuating piston abutment 3, thereby exerting sufficient force on piston abutment 3 to overcome the opposing force of the lighter return spring 10 acting on compensating piston abutment 4. Consequently, the piston valve assembly 2 will be forced upwardly to service position in which exhaust valve seat 9 of stem 5 engages and unseats valve element 6 from supply valve seat 7. Supply fluid pressure from storage reservoir 24 is accordingly admitted to brake cylinders 28 via passage 26, the unseated supply valve, and passage 30. From passage 30, the pressure delivered to the brake cylinders is also delivered via branch passage 30a to chamber 11 where it acts on piston abutment 4 in concert with return spring 10. When the brake cylinder pressure builds up enough that the combined spring and pressure load on piston abutment 4 balances the opposing force exerted on piston abutment 3 by spring 35 (and also by the inherent spring effect provided by bellows 34), the piston valve assembly will be moved downwardly by the valve bias spring 6a until valve element 6 engages supply seat 7. With the supply valve seat closed, supply fluid pressure admitted to brake cylinders 28 is terminated and movement of the piston valve assembly 2 is stabilized with both the supply and exhaust valve seats in engagement with valve element 6. This is commonly known as lap position in which brake cylinder pressure is neither supplied nor released.

The above explained sequence of operations will take place at the time of initial charging of the brake system to apply the brakes. In this sense, a parking brake is obtained to hold the train until such time as the brake system is sufficiently charged to allow the train to proceed safely.

This charging proceeds by way of train line 17 and branch line 17a, via which lines brake pipe pressure is connected to passage 18 and chamber 15. Concurrently, brake pipe pressure in passage 18 flows past charging check valve device 22 to passage 23 leading to control reservoir 19 and to chamber 16. The control reservoir pressure in chamber 16 acts on actuating piston abutment 3 in opposition to brake pipe pressure in chamber 15, while at the same time acting on the effective area of bellows 34 to exert a downward force on the bellows in opposition to the force of spring 35. As the load of spring 35 is progressively counteracted, spring 10 becomes effective in initiate movement of the piston valve assembly downwardly, in response to which movement exhaust valve seat 9 is disengaged from valve element 6 and brake cylinder pressure is accordingly vented to atmosphere via pipe 29, passage 30, the open exhaust valve, the central passage in hollow stem 5, cross passage 33, groove 32 and passage 31. Since chamber 11 is connected by passage 30a to passage 30, the pressure acting on compensating piston abutment 4 is also vented to atmosphere with brake cylinder pressure, further unbalancing the piston valve assembly in a direction to obtain positive movement downward to release position.

As the charging continues with the brakes now released, control reservoir pressure in chamber 16 will continue to follow the buildup of brake pipe pressure in chamber 15, as above explained, with the load on bellows 34 progressively increasing the degree of compression of spring 35 until such time as the bellows engages stop 36.

With the brake system including control valve device 1 now charged, piston valve assembly 2 is stabilized in release position with bellows 34 being disengaged from actuating piston abutment 3.

During a subsequent brake application, which is initiated in the well known manner by effecting a brake pipe reduction in train line 17, charging check valve device 22 will prevent control reservoir pressure in chamber 16 from following the brake pipe pressure. The control reservoir pressure in chamber 16 thus remains constant, so as to serve as a reference against which the brake pipe pressure reduction is measured in terms of a pressure differential across actuating piston abutment 3. In accordance with this pressure differential, piston valve assembly 2 is forced to service position to apply the brakes, as previously explained during the initial charging.

Of significance at this time is the fact that the control reservoir pressure in chamber 16 serves the additional function of maintaining bellows 34 and consequently spring 35 disengaged from the actuating piston abutment.

In the event control reservoir pressure should be undesirably lost, as for example by breakage of pipe 20 or by reservoir 19 becoming damaged, it will be apparent that the effective brake pipe reduction will fail to create the required pressure differential across actuating piston 3 to operate piston valve assembly 2. In accordance with the objective of the present invention, however, this loss of control reservoir pressure effective in chamber 16 relieves the pressure load normally maintaining bellows 34 under compression, thus permitting the force exerted by spring 35 to act on the actuating piston abutment to urge piston valve assembly 2 to service position. In this manner, the bellows senses a loss of control reservoir pressure and responds to establish a back-up spring load as the driving force on the piston valve assembly to obtain a fail-safe brake application.

Of interest to note is the fact that the internal chamber of bellows 34 is pressure-sealed from chamber 16 and from atmosphere so that in the event the bellows ruptures, control reservoir pressure will become effective on the inner surfaces of the bellows to counteract the pressure on the outer surfaces. This automatically unloads the bellows to allow the force exerted by spring 35 to act on piston abutment 3 so as to drive the piston valve assembly to service position when a subsequent brake pipe pressure reduction is made.

An alternative arrangement would be to vent the bellows so that in the event of a rupture, control reservoir pressure in chamber 16 would escape to atmosphere via the vented bellows. As previously explained, the bellows would sense this loss of control reservoir pressure in chamber 16 to automatically effect a fail-safe brake application.

Still another alternative arrangement would be to eliminate spring 35 entirely and rely upon the spring effect inherent in the corrugated structure of bellows 34 to exert sufficient force on actuating piston abutment 3, thereby to obtain the brake forces desired for a fail-safe brake application.

Having now described the invention, what I claim as new and desire to secure by Letters Patent, is:

1. A proportioning-type control valve device for controlling the fluid pressure in a brake cylinder device in accordance with variations of fluid pressure carried in a brake pipe comprising:
    (a) valve means controlling the supply and release of the brake cylinder fluid pressure;
    (b) one-way check valve means for connecting the brake pipe pressure to a control reservoir when the brake pipe pressure exceeds the control reservoir pressure and for preventing the back-flow of the control reservoir pressure to the brake pipe;
    (c) a piston assembly for operating said valve means including an actuating piston abutment subject on one side to the brake pipe pressure and on the opposite side to the control reservoir pressure, said actuating piston abutment being operative responsive to a brake pipe pressure reduction to accordingly move said piston assembly to a service position in which said valve means supplied fluid pressure to the brake cylinder device; and
    (d) spring means for effecting movement of said piston assembly to said service position in the absence of said control reservoir fluid pressure whenever said brake pipe fluid pressure is reduced below a certain chosen value.

2. The control valve device as recited in claim 1, further characterized in that said spring means is arranged to engage said actuating piston abutment in the absence of said control reservoir pressure to exert a load thereon in a direction to effect said movement of said piston assembly to said service position.

3. The control valve device as recited in claim 2, wherein said spring means comprises a bellows device.

4. The control valve device as recited in claim 3, wherein said spring means further comprises a compression spring housed within said bellows device.

5. The control valve device as recited in claim 3, further characterized in that said spring means is housed in a fluid pressure control chamber formed on said opposite side of said actuating piston abutment, whereby said bellows device is compressible in the presence of said control reservoir fluid pressure in said control chamber so as to be disengageable from said actuating piston abutment and expansible in the absence of said control reservoir fluid pressure in said control chamber so as to be engageable with said actuating piston abutment.

6. The control valve device as recited in claim 5, wherein said spring means further comprises a helical control spring housed within said bellows device so as to urge expansion of said bellows device, said control reservoir pressure in said control chamber acting on said bellows to effect compression thereof and accordingly compression of said control spring.

7. The control valve device as recited in claim 5, further characterized in that the inner chamber of said bellows device is pressure-sealed from said control chamber and from atmosphere.

8. The control valve device as recited in claim 5, further comprising stop means for limiting the degree of compression of said bellows device.

* * * * *